United States Patent [19]

Macovski

[11] 4,059,767
[45] Nov. 22, 1977

[54] BACK-ILLUMINATED TRANSPARENCY CONTRAST ENHANCEMENT SYSTEM

[75] Inventor: Albert Macovski, Menlo Park, Calif.

[73] Assignee: Maxim Diagnostic Imaging, Palo Alto, Calif.

[21] Appl. No.: 747,424

[22] Filed: Dec. 27, 1976

[51] Int. Cl.² ............... G01N 21/38; G02B 21/06
[52] U.S. Cl. ............................... 250/461 R; 350/15
[58] Field of Search ............... 250/461 R; 350/156, 350/157, 159, 15

[56] References Cited

U.S. PATENT DOCUMENTS

| | | | |
|---|---|---|---|
| 2,152,353 | 3/1939 | Lewin | 250/461 R |
| 3,682,531 | 8/1972 | Jeffers | 350/156 |
| 4,002,914 | 1/1977 | Macovski | 250/461 R |

Primary Examiner—Steven L. Stephan

[57] ABSTRACT

A transparency is illuminated from the back or non-viewing side through an array of apertures with a light source which is invisible to the viewer. This light passes through the apertures and, after passing through the transparency, is reflected back through the transparency to the aperture structure. The region between apertures is a light converter surface which converts the invisible light to visible light. The visible light passes through the transparency to the viewer with the multiple passes providing contrast enhancement. An additional visible light source is used to provide adequate brightness in relatively dense areas of the transparency.

21 Claims, 4 Drawing Figures

BACK-ILLUMINATED TRANSPARENCY CONTRAST ENHANCEMENT SYSTEM

BACKGROUND OF THE INVENTION

1. Field of the Invention

This invention relates to transparency viewing systems. In a primary application the invention relates to multiple-pass illumination of radiographic transparencies which are difficult to interpret because of inadequate contrast using single-pass illumination.

2. Description of Prior Art

Photographic transparencies often have over or under-exposed regions whose detail contrast is severely reduced. This is particularly true of radiographic transparencies which are under-exposed in relatively opaque regions of the body. Thus relatively subtle lesions, such as small tumors, cannot be visualized because of inadequate contrast.

One of the earliest examples of contrast enhancement is U.S. Pat. No. 2,152,353 issued to Hans Lewin on Mar. 28, 1939, entitled, "Roentgen Photography." In this patent a doubling of the contrast is achieved by illuminating the radiographic transparency with ultraviolet light and using a phosphorescent backing. This effectively doubles the contrast since the film density attenuates both the ultraviolet on the first pass and the visible fluorescent light on the second pass. Although this system inproves the contrast of low-density under-exposed regions, it significantly reduces the visibility of medium and high density regions. In these cases the doubling of the density makes these regions essentially invisible. Thus an additional conventional viewer with back-illumination only would be required. The radiologist would have to move the film from one viewing device to the other to view it over its entire range.

This problem was solved in U.S. patent application Ser. No. 661,959 filed 2/27/76, "Transparency Contrast Enhancement System" invented by Albert Macovski, and now Pat. No. 4,002,914. In this system a combination of front and back illumination is used to provide the desired visibility and contrast at all density ranges. In regions of very low density, the front illumination is used to double the contrast. In regions of relatively high density a source of back illumination is used to provide the required visibility.

The problem with each of these contrast enhancement methods, however, is the requirement for a source of front illumination. Since this light source must be on the same side as the viewer, the configuration can be somewhat awkward. As the viewer's head gets close to the transparency, for a more detailed look, it can obscure the front illumination over portions of the image. Also, the front illuminators must protrude significantly from the image which adds to the awkwardness of the viewing device. A simple portable view box becomes difficult to design.

SUMMARY OF THE INVENTION

An object of this invention is to provide a transparency viewing system with increased contrast having the illumination source on the non-viewing side of the transparency.

It is also an object of this invention to provide a contrast-enhancing system which is controllable over a wide range.

Briefly, in accordance with the invention an aperture structure, having a light converter surface, is placed behind the transparency. A reflecting surface is placed in front of the transparency. A source of illumination, invisible in to viewer, is applied to the aperture structure. This light is transmitted through the apertures and the transparency and then reflected back through the transparency onto the light converter surface where it is converted into light which is visible to the viewer. This visible light is again transmitted through the transparency to the viewer where, due to the multiple passes, the contrast has been increased. In viewing relatively dense regions, an additional visible light source is used to provide single pass illumination.

BRIEF DESCRIPTION OF THE DRAWINGS

For a more complete disclosure of the invention, reference can be made to the following detailed description of several illustrative embodiments thereof which is given in conjunction with the accompanying drawings, of which.

DESCRIPTION OF THE PREFERRED EMBODIMENT

Figure 1:
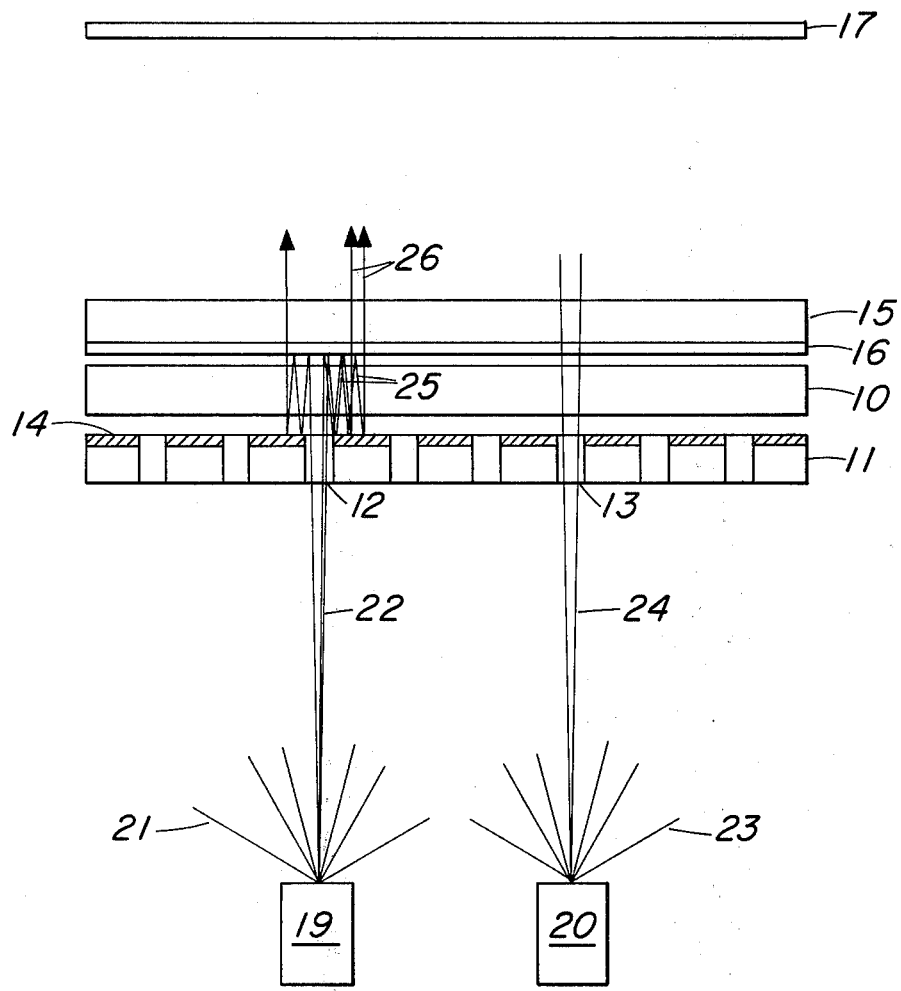
FIG. 1 is a schematic representation of an embodiment of the invention.

An understanding of the broad aspects of the invention may best be had by reference to FIG. 1 of the drawings: A photographic transparency 10 has regions which require contrast enhancement. This transparency can be a radiograph with regions of relatively low exposure such as that due to intervening bone which are difficult to visualize. The radiograph can have regions of very subtle changes in density representing disease processes, such as tumors, where the density change is too small to be visualized. Over and above radiography, the transparency can be a photographic transparency which was poorly exposed so that an improved version is desired.

The transparency 10 is placed against aperture structure 11 which contains an array of openings such as 12 and 13. The aperture structure 11 is illuminated by light source 19 which is invisible to observer 18. As a first example, the light source 19 is a source of ultraviolet light. This light source emits a beam 21 which passes through all of the apertures of aperture plate 11. This is assumed by placing the light source 19 far enough away from the aperture structure 11 or by making the apertures sufficiently shallow. As an example, ultraviolet light rays 22 pass through aperture 12, through transparency 10, to mirror 15 having a reflecting surface 16. This mirror, in general, reflects all or part of the light from source 19, such as light rays 25, back through transparency 10. In this example, reflecting surface 16 can be a dichroic reflector which reflects in the ultraviolet region of the spectrum and transmits in the visible region. Mirror coatings of this type are widely available.

The reflected invisible light 25 will spread somewhat due to the initial divergence of the beam from source 19. This spreading can be enhanced by making the mirror reflecting surface 16 slightly diffuse. The divergent reflected invisible light 25 passes through transparency 10 onto light converter surface 14. This surface converts the invisible light into visible light such as rays 26. In the case where light source 19 is ultraviolet light, converter surface 14 is a phosphorescent material which emits visible light when excited by ultraviolet light. These emitted visible light rays 26 again pass through transparency 10 and are seen by viewer 18. In this embodiment the filter 17 is not necessary and can be omitted.

The light as viewed by the viewer 18 has passed through the transparency a total of three times. Thus the light transmission factor of the transparency is cubed or the density is tripled. Thus subtle density changes in under-exposed regions, such as occur in bony areas, will be significantly enhanced. Relatively dense regions, however, will be rendered essentially invisible by this process. These can be viewed using visible light source 20. This light source, as with 19, is arranged so that its rays 23 pass through every aperture in aperture structure 11. For example, visible light rays 24 pass through aperture 13, through transparency 10 to mirror 15. All or part of this light from source 20 passes through mirror 15. If mirror surface 16 is a dichroic mirror, it can be made fully transmissive in the visible spectrum. Again ignoring filter 17, this light continues on to the viewer 18. This light, having passed through transparency 10 only once, will display the denser regions with their original density. For intermediate regions various combinations of light source 19 and 20 can be used to provide the optimum visualization for all or part of the transparency.

Although the system shown in FIG. 1 has been described using ultraviolet light as the invisible source, light sources 19 and 20 can include a variety of combinations having different spectra. Light source 19, for example, can be within the visible spectrum, such as blue light. In that case filter 17, placed anywhere between mirror 15 and observer 18, is opaque to the blue light from source 19. The converter surface 14 then fluoresces or phosphoresces in some other visible color, such as red, when excited by blue light. Similarly the mirror surface is a dichroic mirror which reflects blue light and transmits red light. Filter 17 passes the light emitted by converter surface 14, such as the red light. Thus filter 17 is a band-pass color filter which, in general, stops the light emitted from source 19 and passes the light emitted from light converter surface 14. For the dense region, light source 20 has a spectrum which is passed by filter 17, which in the foregoing example is red. Thus the viewer will see a red version of transparency 10 with light source 19 providing enhanced contrast in low-density areas and light source 20 providing conventional back illumination for the denser areas.

In the foregoing descriptions reflecting surface 16 was a color selective reflector which reflected the invisible wavelength and transmitted the visible wavelength. If this selective reflector was completely effective, in that it passed none of the light from source 19, then filter 17 would not be required. However, with many dichroic mirrors, some residual transmission occurs in the reflecting region. Alternatively reflective surface 16 can simply be a partially silvered mirror which reflects part of the light and transmits part. The system will operate perfectly satisfactorily in this manner as far as the resultant contrast is concerned. The portion of light source 19 which is transmitted through mirror 15 will be invisible to viewer 18 either because the light itself is outside the visible spectrum or because it is attenuated by filter 17. Thus light source 19 is not used as efficiently as if the reflecting surface 16 is selectively reflective. The portion of light source 19 which is reflected is converted by 14 as before and provides the desired contrast enhancement. The portion of visible light source 20 which is transmitted operates as previously described. The portion reflected will have no effect if it is absorbed by reflecting surface 14. To the extent that it is partially reflected, some small contrast enhancement will occur. This is undesirable in high-density areas so that this effect should be minimized. One of the more serious difficulties in the use of the partially silvered mirror, as contrasted with the color selective mirror, is that visible ambient light is reflected from it, thus reducing the contrast. Thus ambient light should be restricted by the use of either a shadow box surrounding the viewing system, or operating it in a darkened room.

The systems described thusfar have achieved the desired invisibility of light source 19 by virtue of its color. This invisibility can also be achieved by polarization. Light source 19 becomes a source of polarized light. This is simply accomplished, for example, by using a linear polarizer in front of any light source. Linearly polarized light 21 then passes through the aperture plate and transparency 10 as before. Mirror 15 is a partially reflecting mirror, having a partially silvered coating 16, so that a portion of the light, such as light rays 25, are reflected. Converter surface 14 is a diffusely reflecting surface, such as white bond paper, which completely depolarizes the light. Filter 17 is a linear polarizer, or analyzer, which transmits polarized light orthogonal to that of light source 19. Thus the light reflected from converter surface 14, which is orthogonally polarized to that of source 19, goes through the transparency 10, is partially transmitted through mirror 15 and passes through filter 17 to reach the viewer 18. Although the process is inefficient of light, the desired contrast enhancement is reached since the light reaching the viewer 18 has passed through transparency 10 three times.

Light source 20 is linearly polarized orthogonal to that of source 19 so that its rays can pass through transparency 10 and filter 17 and be viewed. Part of this light is reflected by partially reflecting surface 16 back to diffuse converter surface 14. Part of this light is reflected with the same polarization as source 20 and thus again reaches the viewer. However, this multiple-pass light will be a relatively small percentage of the initial transmitted light, so that the amount of undesired contrast enhancement from source 20 will be negligible.

Figure 2:
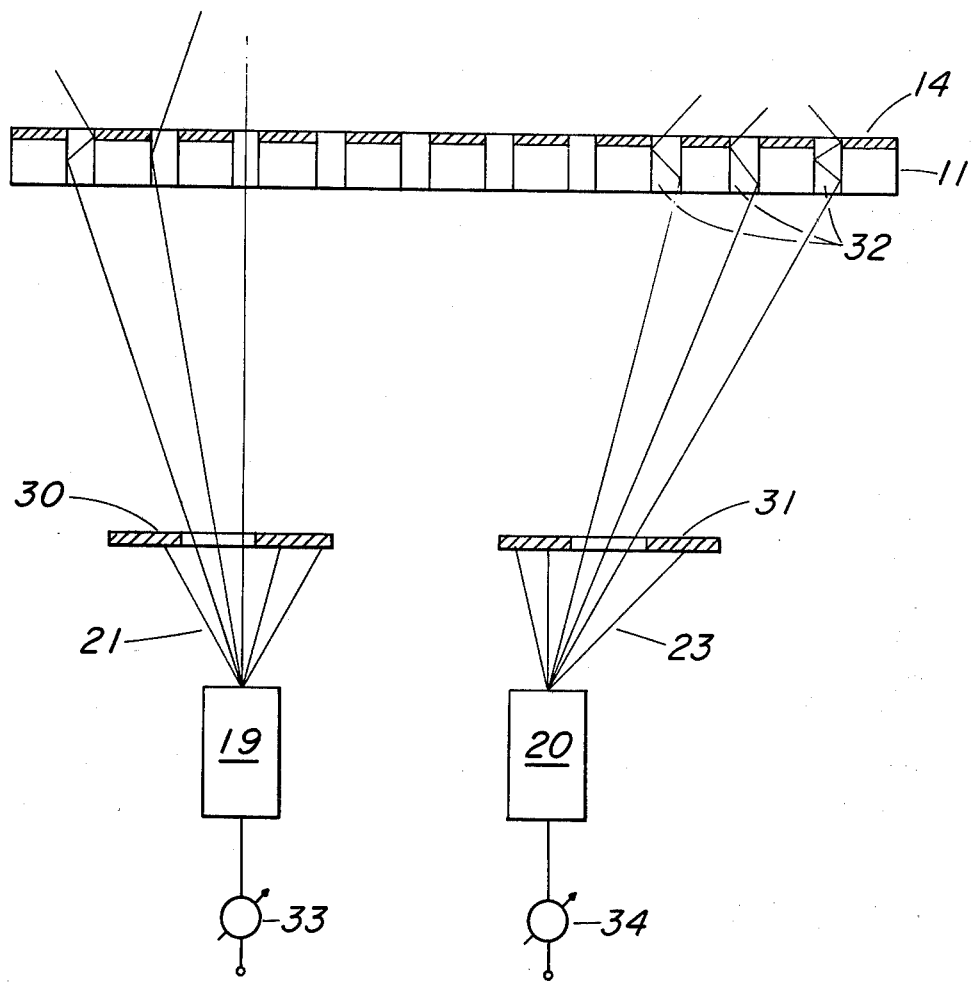
FIG. 2 is a schematic representation of an embodiment of the invention employing controlled light sources and reflective apertures.

In FIG. 1 light sources 19 and 20 are shown each illuminating the entire transparency 10. It may be desirable to have contrast enhancement in some areas and a strong transmitted light without enhancement in other areas of the transparency. In FIG. 2 masks 30 and 31 are shown. These are adjustable in that they can control the position and size of the illuminated regions. In addition light controls 33 and 34, such as rheostats, can individually control the intensity of sources 19 and 20 to provide the optimum visibility in each area of transparency 10.

As was previously indicated the light sources 19 and 20 should be relatively far away from aperture structure 11, and the apertures themselves should be relatively shallow so that most or all of the light ray from each will pass through the apertures. Some alternate approaches can be used such as that shown in FIG. 2. Here the apertures have reflective sides 32. In this way light arriving at different angles passes through the apertures through successive multiple reflections. This enhances the operation of the system since it helps insure that the light reflected from mirror 15 will primarily hit the converter surface 14 and not be returned through the apertures and lost.

Figure 3:
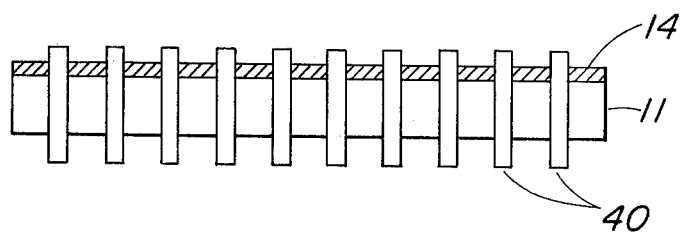
FIG. 3 is a schematic representation of another embodiment of an aperture structure using light fibers.

A similar approach is illustrated in FIG. 3. Here optical fibers 40 are passed through the aperture structure to illuminate the transparency. These provide multiple internal reflections and can accept light from relatively wide angles. For convenience and efficiency in illumination the fibers can be continued on the illumination side and formed into a bundle. They also provide the desired wide exit angle.

Figure 4:
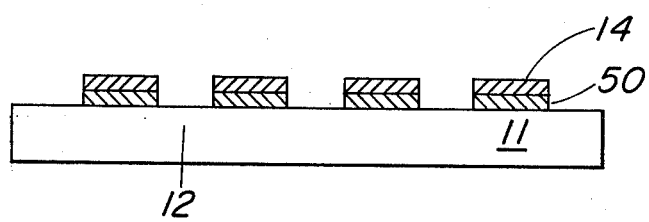
FIG. 4 is a schematic representation of an alternate embodiment of an aperture structure using coatings.

Another aperture structure configuration is shown in FIG. 4. Here the body of the aperture structure 11 contains no holes. Opaque material 50 prevents the incoming light from reaching the converter material 14. Light can thus arrive from very steep angles and continue to pass through the apertures or spaces between the opaque material 50 such as through aperture 12.

In general the contrast enhancement in this system is achieved by light originating from source 19 traversing the transparency 10 three times. This is based on the light reflected from mirror 15 being converted to visible light at converter surface 14. However, part of this reflected light, such as rays 25 in FIG. 1, can be re-reflected by converter surface 14. For example, converter surface 14 can be a phosphor layer which converts part of reflected rays 25 into visible rays 26, and reflects part of these rays in their original invisible form. These invisible rays will again go through transparency 10, be reflected again by mirror 15 back through the transparency to converter surface 14. This multiple reflection process further increases the contrast enhancement. Thus the density in underexposed areas can be more than tripled by making the converter surface 14 partially reflecting in addition to being phosphorescent. Most phosphor materials will reflect some of the incident light.

Although the systems described show two distinct light sources, 19 and 20, which are respectively invisible and visible to the viewer, a single controllable source can be used. For example, light source 19 in FIG. 1 can emit a broad spectrum including components both visible and invisible to the viewer. The invisible components are either intrinsically invisible, such as ultraviolet light, or invisible by virtue of not being transmitted through filter 17. The spectrum from this light source 19 can be altered to change the relative amounts of invisible and visible light so as to provide the desired contrast. This change in spectrum can be achieved by changing the electric power input to the source 19, as with tungsten lamps. The spectral change is more effectively accomplished, however, by using various variable color filters in front of the source.

What is claimed is:

1. Apparatus for enhancing the contrast of a transparency as seen by a viewer comprising:
   ans aperture structure in substantial contact with the non-viewing side of the transparency having an array of transparent regions and having a light converter surface in the non-transparent regions for converting invisible light to visible light;
   a reflective means having a reflective surface in substantial contact with the viewing side of the transparency; and
   means for transmitting a first light component which is invisible to the viewer through the array of transparent regions and, after passing through the transparency, is reflected by the reflective means back through the transparency to the converter surface where it is converted into visible light which is transmitted through the transparency and the reflective means whereby the viewer sees a contrast enhancement of the transparency.

2. Apparatus as recited in claim 1 wherein the first light component includes a spectral region different from the spectral region of the visible light produced by the converter surface.

3. Apparatus as recited in claim 2 wherein the reflective means is primarily reflective to the spectral region of the first light component and primarily transmissive to the spectral region of the visible light produced by the converter surface.

4. Apparatus as recited in claim 2 wherein the first light component is ultraviolet light and the converter surface is a phosphor which produces visible light when excited by ultraviolet light.

5. Apparatus as recited in claim 2 wherein the first light component is light whose spectral region is within the visible spectrum and the visible light produced by the converter surface occupies a region of the visible spectrum different from that of the first light component and including a filter between the reflective means and the viewer which substantially stops the first light component and substantially transmits the light produced by the converter surface.

6. Apparatus as recited in claim 1 wherein the first light component is polarized light and the converter surface reflects light having polarization components orthogonal to that of the first light component.

7. Apparatus as recited in claim 6 wherein the converter surface is a diffuser which depolarizes the incident light.

8. Apparatus as recited in claim 6 including a polarization filter placed between the reflective means and the viewer which substantially stops the first light component and substantially transmits light orthogonal to the first light component.

9. Apparatus as recited in claim 1 including means for controlling the position of the transparency illuminated by the first light component.

10. Apparatus as recited in claim 9 including means for controlling the area of the transparency illuminated by the first light component.

11. Apparatus as recited in claim 1 including means for controlling the intensity of the first light component.

12. Apparatus as recited in claim 1 including means for transmitting a second light component through the apertures which is visible to the viewer.

13. Apparatus as recited in claim 12 including means for controlling the position of the transparency illuminated by the second light component.

14. Apparatus as recited in claim 13 including means for controlling the area of the transparency illuminated by the second light component.

15. Apparatus as recited in claim 12 including means for controlling the intensity of the second light component.

16. Apparatus as recited in claim 1 wherein the array of transparent regions in the aperture structure are holes.

17. Apparatus as recited in claim 16 wherein the holes have reflective sides whereby light arriving at different angles will be transmitted through the aperture structure.

18. Apparatus as recited in claim 1 wherein the array of transparent regions are optical fibers passing through the aperture plate.

19. Apparatus as recited in claim 1 wherein the aperture structure is transparent and the non-transparent regions have an opaque layer between the light converter surface and the first light component.

20. In a method of enhancing the contrast of a transparency the steps of:

illuminating the transparency through an array of apertures with a source of light invisible to a viewer;

reflecting the invisible light back through the transparency to a converter surface between the apertures; and converting the reflected invisible light to light visible to the viewer which is transmitted through the transparency to the viewer.

21. The method of claim 20 including the step of illuminating the transparency throught the array of apertures with a second source of light visible to the viewer.

* * * * *